US005845409A

United States Patent [19]

Kimoto

[11] Patent Number: 5,845,409

[45] Date of Patent: Dec. 8, 1998

[54] DRAWING BOARD

[76] Inventor: Masao Kimoto, 9-6-22 Ishigakinishi, Beppu-Shi, Oita-ken, Japan

[21] Appl. No.: 921,247

[22] Filed: Aug. 29, 1997

Related U.S. Application Data

[63] Continuation of Ser. No. 393,403, Feb. 23, 1995, abandoned.

[30] Foreign Application Priority Data

Jun. 21, 1994 [JP] Japan .................................... 6-186870

[51] Int. Cl.$^{6}$ .............................. G01B 3/04; A47B 27/00

[52] U.S. Cl. ................................................ 33/437; 33/430

[58] Field of Search ....................... 33/437, 430; 24/67.1, 24/67.11

[56] References Cited

U.S. PATENT DOCUMENTS

| | | | |
|---|---|---|---|
| 165,888 | 7/1875 | Stevenson | 33/437 |
| 228,931 | 6/1880 | Richardson | 24/67.1 |
| 308,040 | 11/1884 | Prescott | 33/437 |
| 329,392 | 10/1885 | Jordan | 33/437 |
| 694,389 | 3/1902 | Klitsche | 33/437 |
| 707,165 | 8/1902 | Schlachter, Sr. et al. | 33/437 |
| 1,600,545 | 9/1926 | Hooper | 33/437 |
| 1,679,084 | 7/1928 | Hooper | 33/437 |
| 1,760,408 | 5/1930 | Hooper | 33/437 |
| 1,849,493 | 3/1932 | Larkin | 33/437 |
| 2,089,757 | 6/1937 | Nieuwkamp | 33/437 |
| 2,195,694 | 4/1940 | Cunningham | 33/437 |
| 2,508,157 | 5/1950 | Hanna | 24/67.1 |
| 2,578,524 | 12/1951 | Ericson | 33/437 |
| 3,537,183 | 11/1970 | Anderson | 33/437 |
| 4,819,338 | 4/1989 | Lategan et al. | 33/437 |

FOREIGN PATENT DOCUMENTS

| | | | |
|---|---|---|---|
| 8251 | 7/1902 | Australia | 33/437 |
| 35882 | 3/1930 | France | 24/67.11 |
| 3290 | 3/1886 | United Kingdom | 33/437 |

*Primary Examiner*—Thomas B. Will

*Attorney, Agent, or Firm*—Sughrue, Mion, Zinn, Macpeak & Seas, PLLC

[57] ABSTRACT

A drawing board and clipscale combination in which a paper holder and a ruler are united in a single body. The board has a groove and a portion overhanging it along each of the four sides. The clipscale includes a ruler, one side of which is protruded in the middle with a screw hole for receiving a screw. The other side of the ruler is a base side, and on the back is a linear hook-shaped stopper. The stopper is received in the groove of the board, and paper is positioned while the screw is loose. As the screw is threaded deeper, the one side of the clipscale is raised off the board, with the hook of the stopper engaged complementarily with the portion overhanging the groove of the board, so as to serve as a fulcrum. The base side is forced against the board with paper therebetween, so that the paper and the clipscale are fixed on the board in one action.

10 Claims, 4 Drawing Sheets

DRAWING BOARD

This is a Continuation of application Ser. No. 08/393,403 filed Feb. 23, 1995 now abandoned.

BACKGROUND OF THE INVENTION

1. Field of the Invention

This invention relates to a combination drawing board and clipscale in which the clipscale holds a piece of paper against the drawing board.

2. Description of the Related Art

Various types of drawing boards are known. However, all of these drawing boards have shortcomings such as the need for push pins or adhesive tape to secure the paper, as well as a long T square or expensive drafting tool. Further, the areas covered by the rulers are not always satisfactory. Such devices are also available with grooves formed in the drawing board which receive part of a ruler to allow it to slide and to prevent it from wobbling out of place. Operating handles or screws fix the ruler in a groove of the drawing board. However, all of these devices are designed only to stabilize the ruler. Some devices aim to hold paper on the drawing board by means of a ruler, which has to be fixed by screws to the board. However, none of the devices aim to hold paper on the board by using a ruler as leverage.

SUMMARY OF THE INVENTION

This drawing board, invented to eliminate the above-described shortcomings of the related art, is a combination of a drawing board and a clipscale that holds the paper and also acts as a ruler.

The board has a groove with a portion overhanging the same along each of four sides of the board, adjacent grooves intersecting each other at right angles, while the clipscale has a portion protruded from one side for a screw hole with an adjustable screw received therein, and a straight base on the other side. On the back of the clipscale is a linear, yet L-hook-shaped stopper formed across the length in the middle.

By threading the screw to raise one side of the clipscale off the board surface, the stopper whose hook acts as a fulcrum is engaged complementarily with the portion overhanging the groove of the board, and at the same time, paper placed under the base side lined with a slip-stopper as well as the clipscale itself, is held firmly on the board by leverage.

An ordinary triangle is positioned on the base side when drawing. Paper can be positioned while the screw is loose. The stopper of the clipscale may be set in any of the four grooves, and slidable therein, and even partly protruding beyond the board limits.

DESCRIPTION OF THE PREFERRED EMBODIMENT

Figure 1:
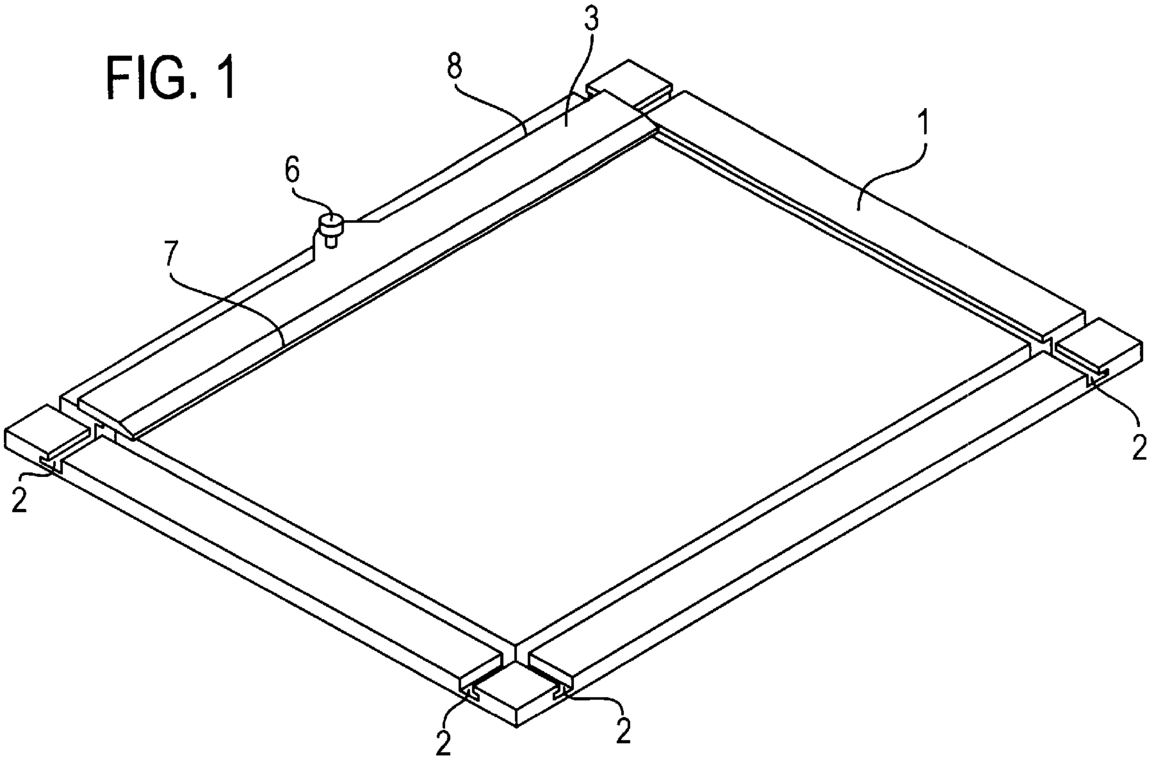
FIG. 1 is an oblique projection of a combination of a drawing board and a clipscale of the present invention.
Figure 2:
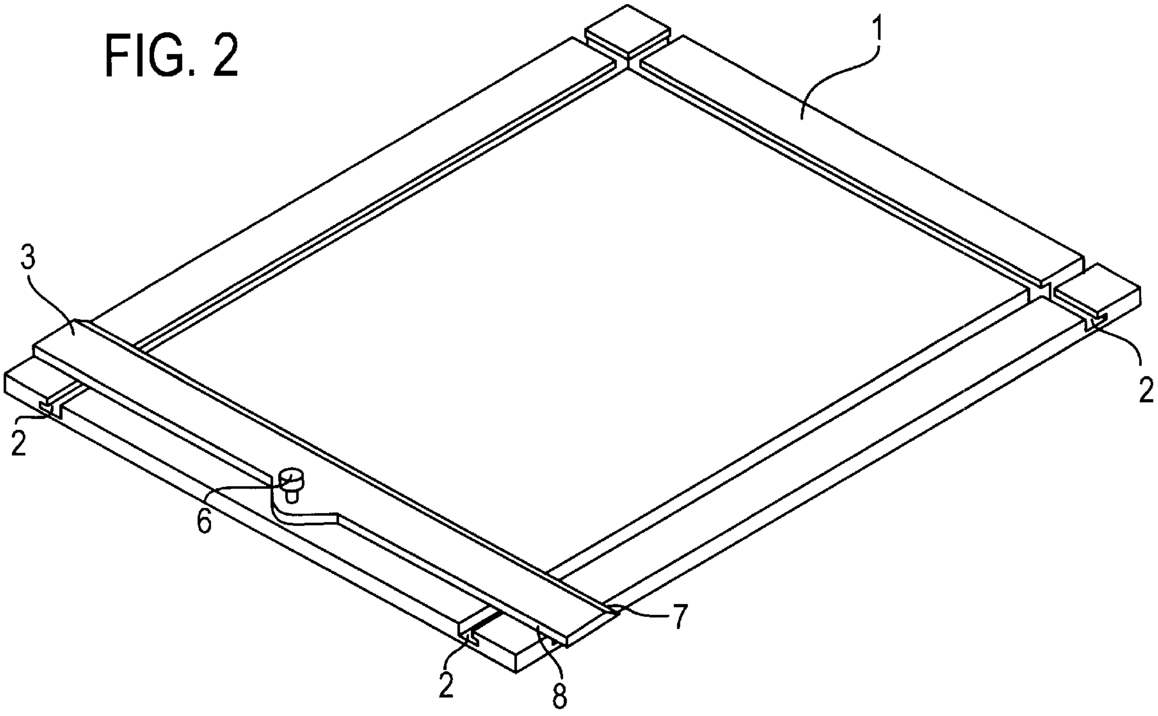
FIG. 2 shows the combination where the clipscale is mounted on the drawing board at a position different from FIG. 1.
Figure 3:
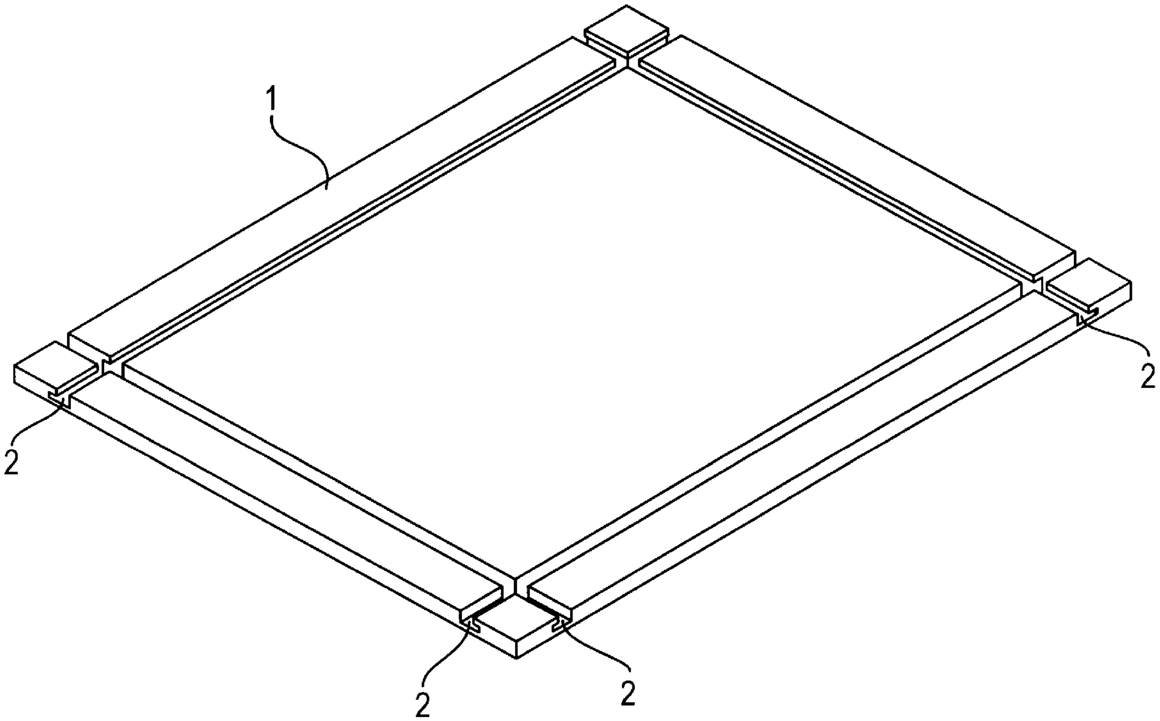
FIG. 3 is an oblique projection of the drawing board of the present invention.

FIGS. 1 and 2 show a drawing board 1 and a clipscale 3. The board 1 is rectangular with a planar surface. As shown in FIG. 3, the board 1 has a linear groove 2 with a portion overhanging the same along each of four sides, running through from one side to the other, and intersecting at a right angle with an adjacent groove 2. The preferred location of the grooves 2 may be as near to each side of the board 1 as will allow a screw 6, when driven, to rest on the board 1 by a narrow margin.

Figure 4:
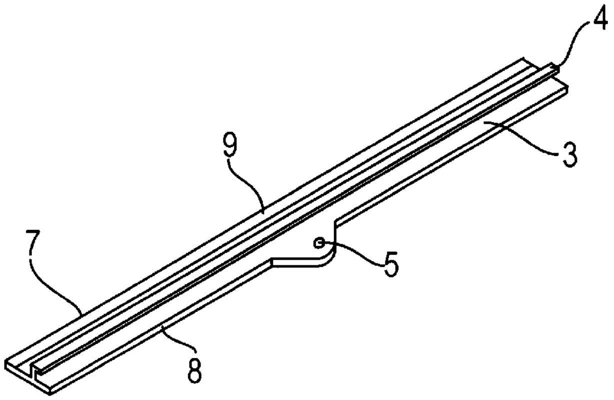
FIG. 4 is an oblique projection of the back side of the clipscale of the present invention.

As can be clearly seen from FIGS. 1 and 4, the clipscale 3 has a portion protruded from one side 8 at the mid-point of its length. The protruded portion has a screw hole 5 with a manually adjustable screw 6 received therein, and a base side 7 opposite the one side 8, while the back side of the clipscale 3 has a linear hook-shaped stopper 4 in the middle over the length of the instrument. The stopper 4 is set in one of the grooves 2, and shoved outward so as to align with the portion overhanging the groove 2, to be complementarily engaged with the groove 2 on the drawing board 1.

As the screw 6 is threaded deeper into the screw hole 5, the point of the screw 6 reaches the surface of the board 1 and pushes it to raise one side 8 of the clipscale, while the portion overhanging the groove 2 is pressed from underneath with a portion of the stopper 4 and firmly hooked up with each other complementarily.

Figure 5:
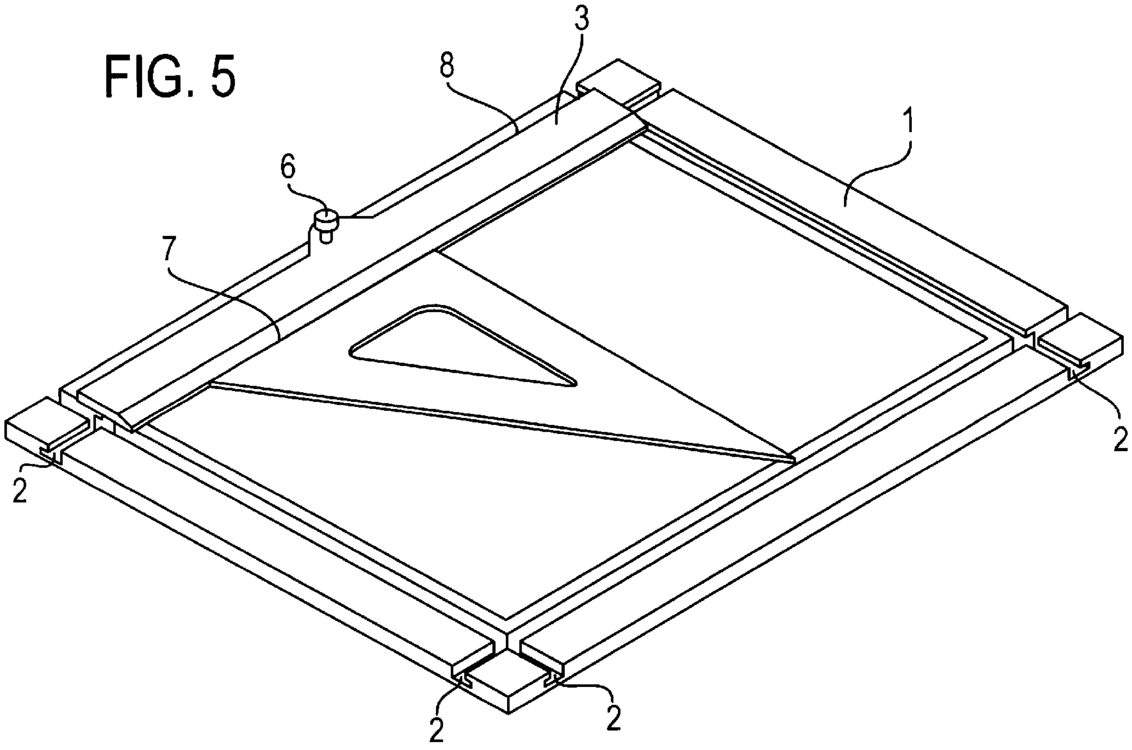
FIG. 5 is an oblique projection showing the present invention in use.
Figure 7:
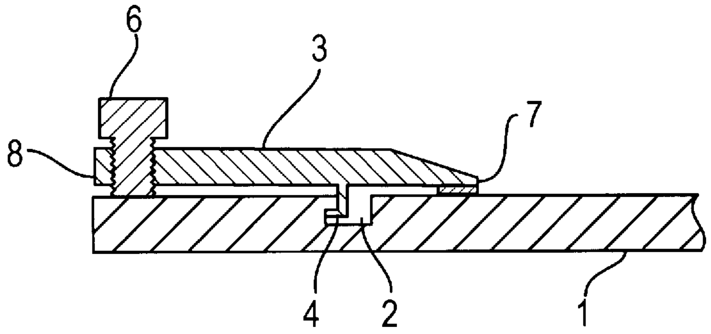
FIG. 7 is an enlarged mid-cross section showing a groove engaged with the stopper.

The stopper 4 acts as a fulcrum, pressing the base side 7 as well as a sheet or sheets of paper in between onto the board 1, as shown in FIG. 5. The base side 7 may have a non-skid pad 9 to help clamp the paper to the board 1. Thus the clipscale 3 is engaged firmly with the board by a single levering action, which is shown in the cross section of FIG. 7. It is characteristic of this invention that the leverage is produced by the clipscale 3. That is, both the paper holder and the ruler are united in a single body of the clipscale 3.

In practice, an ordinal triangle may be aligned on the base side 7 of the clipscale 3 as shown in FIG. 5. The stopper 4 does not touch the bottoms of the grooves 2, so as to be slidable when the screw 6 is not driven enough, and therefore paper can be positioned with ease.

Either end of the stopper 4 of the clipscale 3 may protrude beyond the board limit left and right, or up and down as long as the screw rests on the margin of the board, so the work of drawing near the board sides becomes easy and steady.

Figure 6:
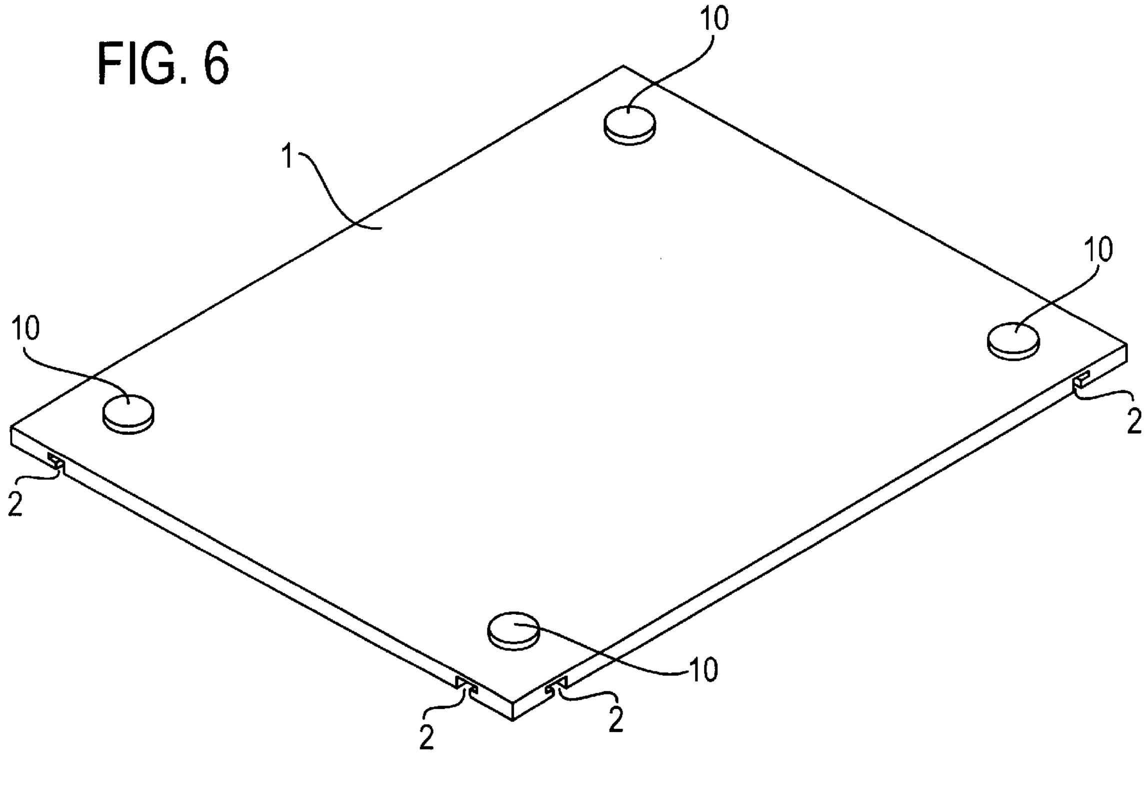
FIG. 6 is an oblique projection of the back side of the drawing board of the present invention.

Further, as is shown in FIG. 6, to stabilize the drawing board 1, gum plates 10 may be put on the back corners.

The foregoing description is of a preferred embodiment of the invention. However, the invention should not be confined to the specific construction and arrangement of parts described above, as various changes or modifications may be made in practice that fairly fall within the scope of my claimed invention.

I claim:

1. A combination drawing board and clipscale, comprising:

- a drawing board having at least one groove in an upper surface of the drawing board, said groove having an overhanging portion;
- a clipscale having a first member that is received in said groove and engages said overhanging portion, and means for pivoting the clipscale about said first member to press an edge of the clipscale against the upper surface of the drawing board, wherein said means for pivoting comprises a screw hole in said clipscale and a screw threadably engaged with said screw hole.

2. A combination drawing board and clipscale as recited in claim 1, wherein said groove is substantially L-shaped in cross section.

3. A combination drawing board and clipscale as recited in claim 1, wherein said first member is substantially L-shaped in cross section.

4. A combination drawing board and clipscale as recited in claim 1, comprising four grooves in the upper surface of said drawing board, each of said four grooves having said overhanging portion.

5. A combination drawing board and clipscale, comprising:

a drawing board having at least one groove in an upper surface of the drawing board, said groove having an overhanging portion; and a clipscale having a first member that is received in said groove and engages said overhanging portion, and a second member that is movably engaged with said clipscale, said second member being disposed for movement toward and away from the upper surface of said drawing board and contacting the upper surface to pivot said clipscale about said first member so that a portion of said clipscale is pressed against the upper surface of said drawing board.

6. A combination drawing board and clipscale as recited in claim 5, wherein said second member is disposed at substantially a mid point of said clipscale in a direction of length of said clipscale.

7. A combination drawing board and clipscale as recited in claim 5, wherein said drawing board has four grooves in the upper surface, each of said grooves having said overhanging portion.

8. A combination drawing board and clipscale as recited in claim 7, wherein said four grooves intersect each other at right angles and each one of said four grooves extends from one edge of said drawing board to an opposite edge.

9. A combination drawing board and clipscale as recited in claim 5, wherein said clipscale includes a ruler.

10. A combination drawing board and clipscale as recited in claim 5, further comprising a non-skid pad provided on the portion of said clipscale that is pressed against the upper surface of said drawing board.

* * * * *